United States Patent [19]

d'Alayer de Costemore d'Arc

[11] Patent Number: 4,574,372
[45] Date of Patent: Mar. 4, 1986

[54] LOCKING DEVICE FOR RECORD PLAYER APPARATUS

[75] Inventor: Stéphane M. A. d'Alayer de Costemore d'Arc, Ways, Belgium

[73] Assignee: Staar S.A., Brussels, Belgium

[21] Appl. No.: 568,141

[22] Filed: Jan. 4, 1984

[30] Foreign Application Priority Data

Jan. 18, 1983 [BE] Belgium ............................... 209919
Jun. 30, 1983 [BE] Belgium ............................... 211089

[51] Int. Cl.⁴ ........................... G11B 3/10; G11B 7/00
[52] U.S. Cl. ...................................... 369/244; 369/41;
369/79; 369/215; 369/230; 369/233; 369/251;
369/257
[58] Field of Search ................ 369/244, 251, 252, 41,
369/230, 233, 257, 215, 34, 79

[56] References Cited

U.S. PATENT DOCUMENTS

| | | | |
|---|---|---|---|
| 3,281,152 | 10/1966 | Narutani | 369/244 |
| 3,503,615 | 3/1970 | Matsuda | 369/244 |
| 4,260,162 | 4/1981 | Morii et al. | 369/215 |
| 4,403,316 | 9/1983 | Veerdonk | 369/244 |
| 4,455,641 | 6/1984 | Sliski | 369/244 |
| 4,460,991 | 7/1984 | Omoto | 369/230 |

Primary Examiner—Steven L. Stephan
Attorney, Agent, or Firm—Leydig, Voit & Mayer Ltd.

[57] ABSTRACT

A laser disk record player particularly adapted for mobile applications such as in portable players and automobile mounted players. The player is provided with locking means for preventing free movement of the laser carrying scanning assembly when the player is switched off, thereby to prevent excessive wear or accidental damage caused by random acceleration of the normally free arm. With the record player in the load position, the locking means engages the scanning assembly to prevent motion thereof. When a disk is inserted and the player is switched to the play position, means are provided for automatically freeing the locking means thereby to allow the control circuit of the laser player to take over positioning of the arm.

4 Claims, 6 Drawing Figures

LOCKING DEVICE FOR RECORD PLAYER APPARATUS

The present invention relates to record players and more particularly to such players which record and play back information in digital form.

Such players utilize a disk on which information is recorded, and which is rotated at a relatively high rate of speed, to cooperate with a laser which functions in both the recording and playback operations. In order to scan the entire surface of the record, the laser light source and/or its associated optical system is usually mounted on a moving assembly. The two most frequently used types of moving assemblies are the linear displacement carriage type and the balanced arm type which rotates about an axis.

When the recording apparatus is operative, the control circuit of the recorder controls the position of the scanning assembly which carries the laser. However, when the recorder is switched off, the assembly is released, and remains unrestrained for so long as the player remains off.

While that arrangement is not particularly disadvantageous for domestic applications in which the player is permanently mounted and remains stationary, it represents a considerable drawback for portable apparatus such as hand portable players or those installed in automobiles. More particularly, portable and automobile mounted apparatus is normally subjected to various unpredictable accelerations, decelerations and shocks which can be transmitted to the scanning assembly carrying the laser, causing it to move unpredictably with resulting wear and possible damage.

Accordingly, it is the main object of the present invention to provide an improved portable laser disk player in which the movable laser elements are restrained from movement when the player is not in operation.

In that regard, it is a further object to provide a mechanism for restraining the scanning elements of a laser disk player which is simple and inexpensive in construction, but reliable in operation.

Other objects and advantages will become apparent upon consideration of the following detailed description when taken in conjuction with the drawings in which.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
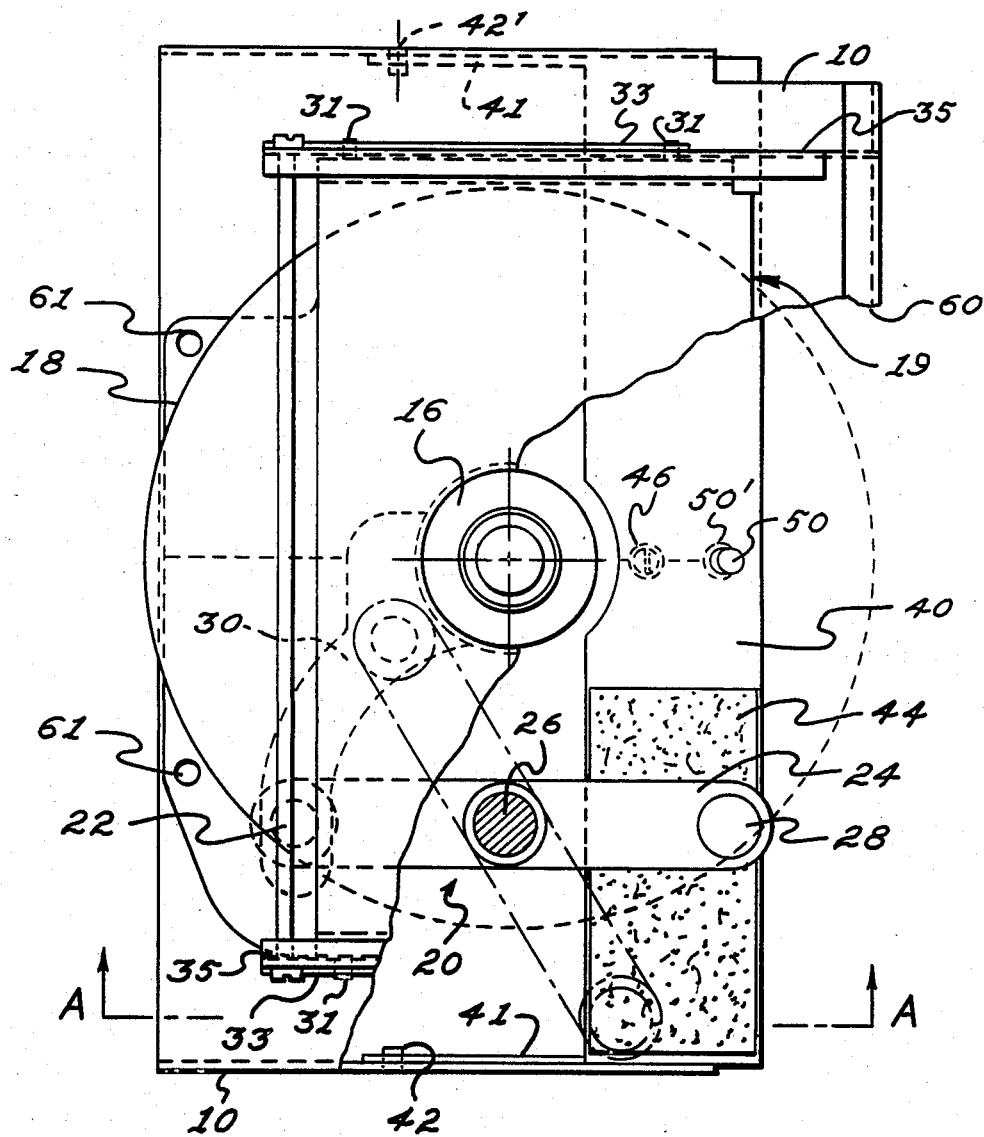
FIG. 1 is a plan view of a laser disk player, partly cut away, shown in the operating position.
Figure 2:
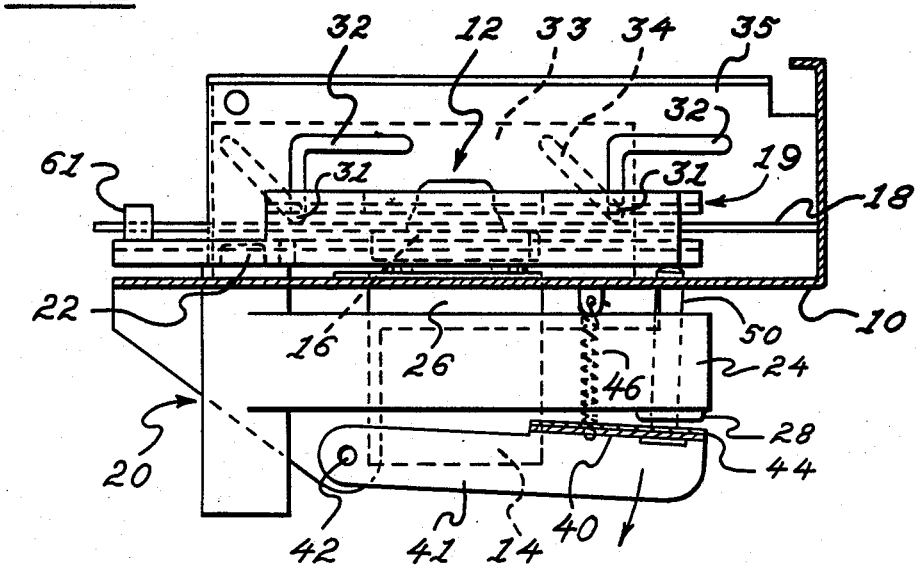
FIG. 2 is a section taken along the line A—A of FIG. 1.
Figure 3:
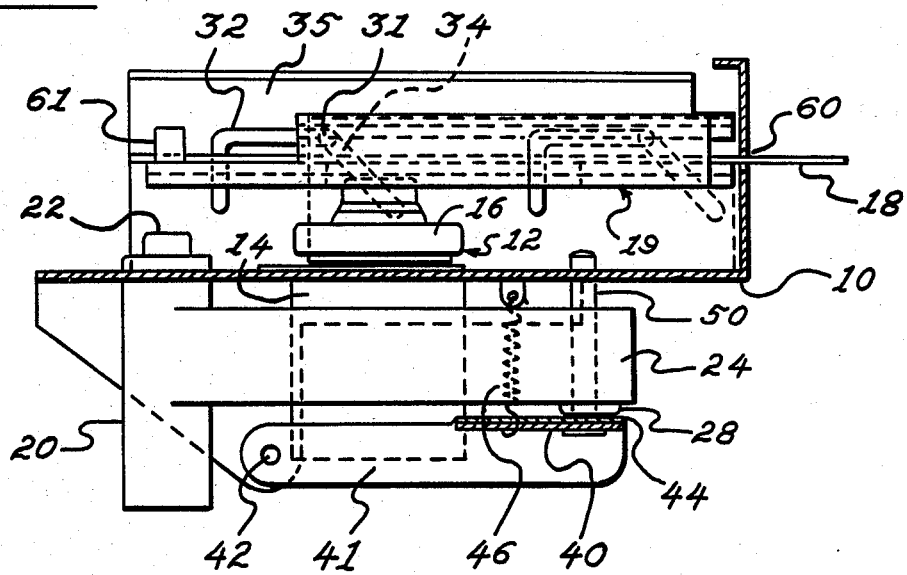
FIG. 3 is a section similar to FIG. 2, but showing the player in the lead position.

Turning now to the drawings, FIGS. 1-3 illustrate a laser disk player including means for locking the scanning laser assembly embodying the present invention. The disk player is based on a rigid frame 10 to which are mounted a movable record positioning housing 19 and driving means 12, including a motor 14 and a rotating disk 16 coupled thereto. As illustrated in FIG. 2, when the apparatus is in the play or operative position, the disk 16 engages a record 18 for rotating the record at a relatively high rate of speed.

The scanning apparatus of the illustrated player is of the balanced arm type, although the invention is also applicable to the linear displacement carriage type of player. In the illustrated embodiment, the scanning laser support 20 includes a laser source 22 and the necessary optics mounted at one end of a lever 24 arranged to rotate about a spindle 26 which is fixed to the frame 10. The opposite end of the lever 24 is provided with a balancing weight 28. An arcuate slot 30 in the frame 10 is provided to permit the laser 22 to read or record information on the disc. The scanning assembly includes or is fabricated from permeable magnetic material with interacts with a variable magnetic field produced by a control circuit (not shown) to control the position of the laser assembly during operation of the player. Variation in the magnetic field causes the lever 24 to rotate about its axis 26 such that the laser 22 and its associated optics can scan the record surface from its internal diameter (illustrated by the dotted line position in FIG. 1) to its external diameter (illustrated by the solid line showing).

During the actual playing operation as illustrated in FIGS. 1 and 2, the control circuit produces a magnetic field which accurately controls the position of the scanning laser assembly 20. However, when the unit is switched to its inoperative or load position shown in FIG. 3, the magnetic flux is terminated and the arm 24 is free to rotate about the pivot 26 in dependence upon whatever external forces might be applied.

In accordance with the invention, lock means are provided for restraining movement of the scanning laser assembly 20 under conditions when the player is switched off. In the illustrated embodiment, such means include a pivoting plate 40 which is connected by arms 41 to spindles 42, 42[1] supported by the frame 10 which, as best shown in FIGS. 1 and 3 is adapted to engage the weighted side of the arm 24 to restrain movement thereof. Preferably, the section of the pivoting plate 40 intended to come into contact with the arm 24 is covered by a resilient material such as rubber covering 44.

In order to bias the lock means 40 into its operative restraining position, a spring 46 is fixed at one end to the plate 44 and at the other to the frame 10. As a result, the plate 44 is normally biased into its lock position to restrain the movable laser carrier from uncontrolled rotation.

In the embodiment illustrated in FIGS. 1-3, actuator means are provided for translating the lock means from its locked condition to its unlocked condition when the player is in the play position. More particularly, there is provided a rod 50 affixed at one end to the plate 44 and projecting through an aperture 50 in the plate 10 so as to be free to engage the disk carrying housing 19 in the play position.

When the apparatus is in the load position illustrated in FIG. 3, the rod 50 freely projects through aperture 50' allowing the spring 46 to bias the rubber covered surface of the plate 40 against the movable laser arm 24, thereby locking the arm in a fixed position so that the apparatus can be subjected to shocks of various sort without damage. However, when a disk is inserted into the apparatus and moved into operative position for playing, such as illustrated in FIG. 2, it is seen that the underside of the movable disk carrier 19 engages the end of the rod 50 to overcome the bias of spring 46 and pivot the plate 44 away from engagement with the pivotable arm 24, thereby freeing the laser carrier to respond to the magnetic field produced by the laser for appropriately tracking the disk.

The present invention is adaptable to numerous types of disk player apparatus including, as stated previously, apparatus of the translating and rotating type. Among the apparatus with which the present invention can be used is that disclosed in Schatteman U.S. application Ser. No. 437,189, filed Oct. 29, 1982, Agostini U.S. application Ser. No. 485,848, filed May 18, 1983, and Staar U.S. application Ser. No. 454,240, filed Dec. 29, 1982, all assigned to the assignee of the present invention. The exemplary apparatus illustrated herein is based on that disclosed and claimed in the aforementioned Schatteman application.

As illustrated in FIG. 3, and as described more completely in the Schatteman application, a disk 18 is inserted into the disk carrier 19 which is movable along a path established by a pair of inverted L-shaped recesses 32. More particularly, the moving housing carries a set of pins 31 which ride in the L-shaped recesses 32 formed in a bracket 35 which is integral with the frame 10. A movable plate 33 having inclined slots 34 is also associated with the pins 31 and is adapted for translation as viewed in FIGS. 2 and 3.

Accordingly, when the apparatus is in the load position illustrated in FIG. 3, a disk can be inserted through a slot 60 to engage a rear pair of pins 61 in the record carrier 19. The record is then pushed further into the player, translating the movable plate 33 carried by the pins 31 while the horizontal portion of the inverted L-shaped slots 32 restrains movement of the carrier 19 in the horizontal plane. When the pins 31 reach the perpendicular portion of the L-shaped slots 32, the movable bracket 33 continues its leftward movement while the record carrier 19 then moves in a downward direction, ultimately engaging the record 18 with the driving member 16. It is seen that the elements above the driving disk 16 are chamfered to guide the record into the operative position and assure it is properly centered before initiation of rotation.

Figure 4:
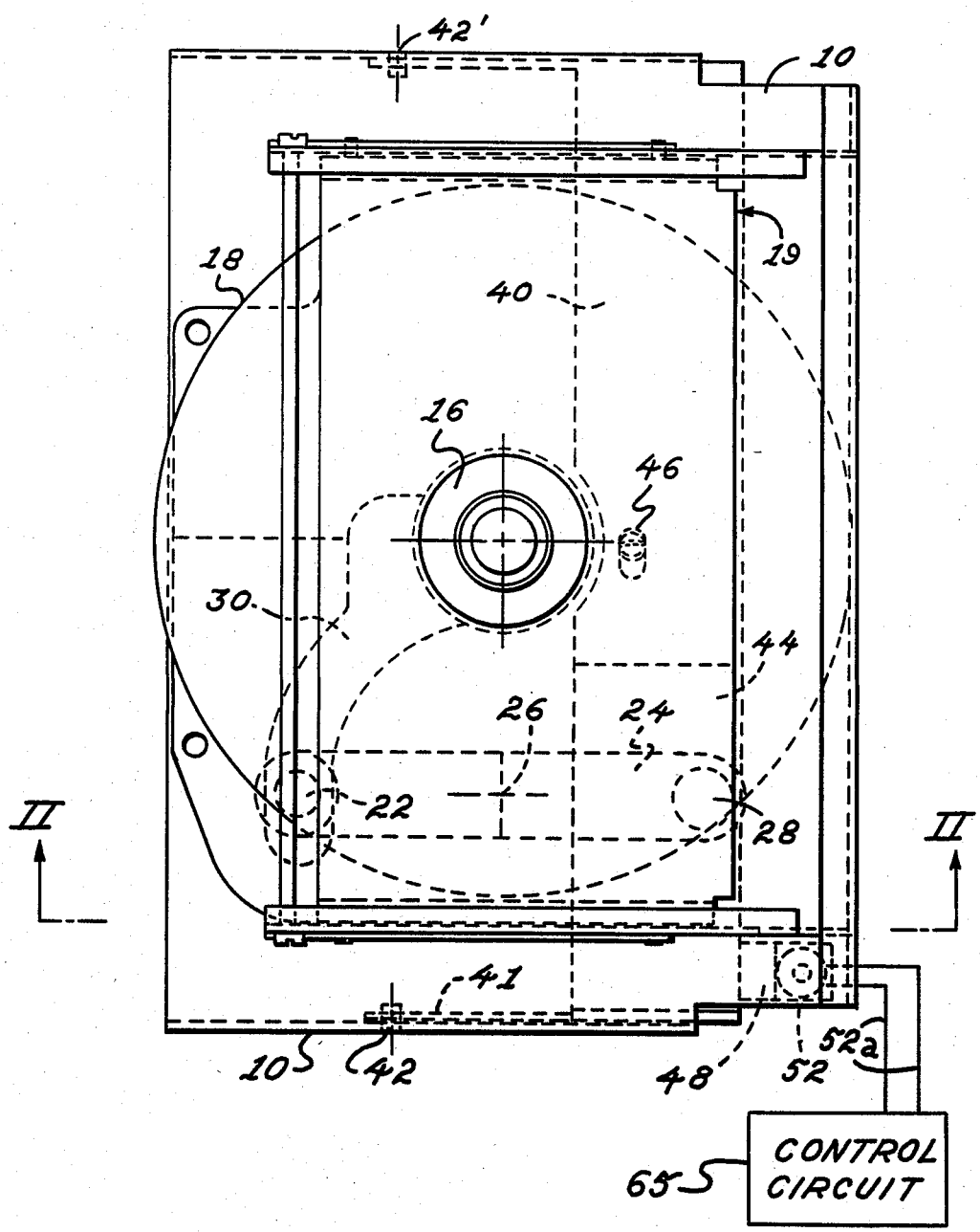
FIG. 4 is a plan view like FIG. 1 illustrating an alternative embodiment in the play position.
Figure 5:
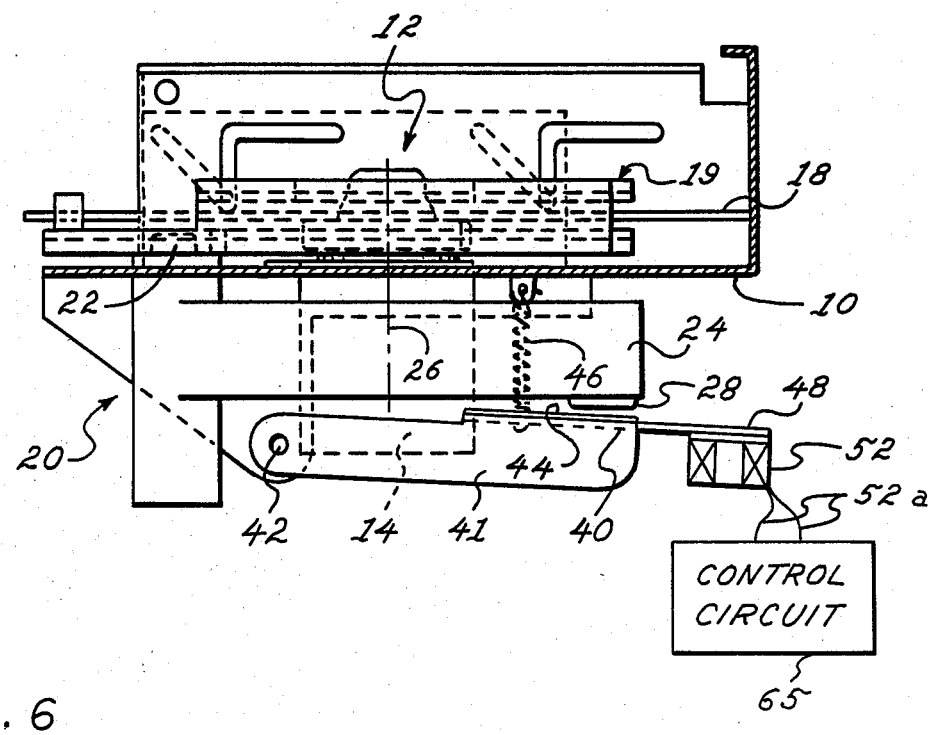
FIG. 5 is a section along the line II—II of FIG. 4.
Figure 6:
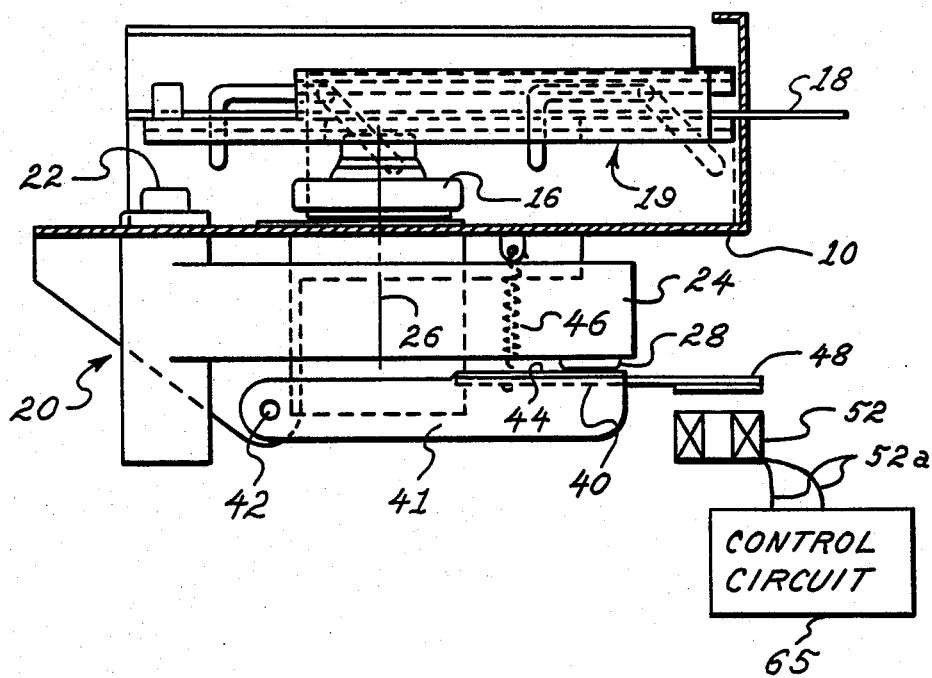
FIG. 6 is a section similar to FIG. 5 showing the player in the lead position

Turning now to FIGS. 4-6, there is shown an alternative embodiment of the present invention in the context of the basic disk player configuration desribed above. In this embodiment, the pivotable plate 40 carries and extension 48 integral therewith, such extension being made of ferromagnetic material. As best shown in FIGS. 5 and 6, the extension 48 is adapted to engage an electromagnet 52 having a pair of leads 52a connected to the control circuit 60.

The control circuit 60 is not illustrated in detail, but is of the type which energizes the motor 14 for rotation after the disk is translated from the load position illustrated in FIG. 6 to the play position illustrated in FIG. 5. At that point, the control circuit 60 energizes the motor 14 to rotate the disk. At the same time, the control circuit energizes the electromagnet 52 which draws the extension 48 of the plate 40 into engagement, thereby releasing the scanning laser assembly 20. When the player is switched off, the disk carrier 19 can either automatically return to the load position illustrated in FIG. 6 or remain in the play position illustrated in FIG. 5, but the control circuit deenergizes the electromagnet 52 to release the extension 48 of the pivotable plate 40, thereby engaging the movable laser carrying arm to restrain same from unintended motion.

As will now be apparent, what has been provided is an improved laser disk player particularly adapted for mobile use such as for portable players or automobile mounted players, in which means are provided for securely locking and preventing damage or excessive wear to the scanning apparatus which, during the normal course of events, translates the laser to scan the disk in the play position.

I claim:

1. In a record player having a movable record positioning means for translating a record from an inoperative load position to an operative play position, and a movable scanning support for operatively associating a laser carried by the support with a rotating record, the improvement comprising locking means associated with the movable scanning support having a locked position for engaging said support to restrain movement thereof and an unlocked position for freeing said support for scanning the record, and actuator means associated with the locking means for rendering said locking means locked when the player is switched off and including means for engaging the movable record positioning means for rendering said locking means unlocked when the record positioning means is in the play position.

2. The record player as set out in claim 1 further including means for biasing the locking means toward the record positioning means so as to render the locking means locked when the record positioning means is in the load position.

3. In a record player having a frame, a record positioning means on the frame for translating a record from an inoperative load position to an operative play position, and a movable scanning support on the frame for operatively associating a laser carried by the support with a rotating record, the improvement comprising locking means associated with the movable scanning support having a locked position for engaging said support to restrain movement thereof and an unlocked position for freeing said support for scanning the record, said locking means including a pivoting plate connected for pivoting to the frame, and spring means biasing said pivoting plate to the locked position, and actuator means associated with the locking means for rendering said locking means locked when the player is switched off and for rendering said locking means unlocked when the record positioning means is in the play position, said actuator means including means for engaging the movable record positioning means for pivoting said pivoting plate against the spring force of said spring means, thereby to free the scanning support.

4. In a record player having a movable record positioning means for translating a record from an inoperative load position to an operative play position, and a movable scanning support for operatively associating a laser carried by the support with a rotating record, the improvement comprising locking means associated with the movable scanning support having a locked position for engaging said support to restrain movement thereof and an unlocked position for freeing said support for scanning the record, said locking means including a pivoting plate connected for pivotable movement to the frame, and actuator means associated with the locking means for rendering said locking means locked when the player is switched off and for rendering said locking means unlocked when the record positioning means is in the play position, said actuator means including an electromagnet cooperating with the pivotable plate, said electromagnet normally being deenergized to render said locking means in the locked position, and a control circuit for energizing the electromagnet when the player is in the play position, thereby to attract the pivotable plate and free the movable scanning support for scanning a record.

* * * * *